Patented Dec. 25, 1934

1,985,844

UNITED STATES PATENT OFFICE 1,985,844

PROCESS FOR THE MANUFACTURE OF AROMATIC HYDROCARBONS CONTAINING UNSATURATED SIDE CHAINS

Hermann Suida, Vienna, Austria, assignor to I. G. Farbenindustrie Aktiengesellschaft, Frankfort-on-the-Main, Germany No Drawing. Application July 25, 1931, Serial No. 553,213. In Austria August 16, 1930

13 Claims. (Cl. 260—168)

The present invention concerns the manufacture of aromatic hydrocarbons containing unsaturated side chains, such as for example, styrene, vinylnaphthalene, divinyl-naphthalene, isopropenylnaphthalene, homologues and analogues thereof by subjecting aromatic compounds having at least one saturated side chain —CHR—CH$_2$R' (R and R' being a hydrogen atom or an aliphatic hydrocarbon radical) such as ethylbenzene, diethylbenzene, ethylnaphthalene, diethylnaphthalene, isopropylnaphthalene, diisopropylnaphthalene or homologues or analogues thereof to temperatures of 450–700° C. at a strongly reduced pressure.

The manufacture of styrene and ethylstyrene from ethylbenzene or diethylbenzene by heating to 450–700° C. in an iron tube in the absence of catalysts and at normal pressure is known. The yields obtained by this process are relatively low and on an average do not amount to more than 30% of styrene or ethylstyrene by once passing the starting material through the reaction tube. Moreover the resulting products are strongly contaminated by the presence of decomposition products whereby a separation of the styrene hydrocarbons in a pure form is rendered difficult. The manufacture of the naphthalene compounds analogous to styrene by dehydrogenation of the corresponding alkyl naphthalene has not hitherto been achieved.

In accordance with the present invention the dehydrogenation of alkylated aromatic hydrocarbons having at least one saturated side chain —CHR—CH$_2$R' (R and R' being a hydrogen atom or an aliphatic hydrocarbon radical) such as for example ethylbenzene, ethylnaphthalene, diethylbenzene, methylethylbenzene, isopropylbenzene, diethylnaphthalene, propylnaphthalene, butylnaphthalene and the like or of homologues, analogues and substitution products thereof such as chloroethylbenzene, chloroethylnaphthalene etc. can quite generally be effected smoothly provided that the reaction is carried out at temperatures between 450 and 700° C. at strongly reduced pressure below 100 mms. of mercury and especially at about 10 mms. to about 20 mms. of mercury. By the application of strongly reduced pressure there is attained an increased velocity of reaction and furthermore the deposition of carbon and the formation of tarry or other decomposition products can thus be reduced to a far reaching extent. When in addition to the vacuum appropriate catalysts are likewise employed a considerable acceleration of the reaction is attained together with an increase in the amount converted in a single passage of the starting material through the reaction chamber. There can be used as catalysts any desired simple or mixed dehydrogenation catalysts which are stable and efficacious at the reaction temperatures with or without the addition of a carrier. The following catalysts have been found particularly satisfactory for the dehydrogenation under strongly reduced pressure: a mixed basic copper-iron-nickel catalyst on pumice stone, the rare earths, such as for example cerium oxide, deposited on broken pieces of clay, or zinc oxide or mixed catalysts of the kinds specified.

The following examples will further illustrate but not restrict the invention:—

*Example 1*

A gas tight reaction tube is charged with a mixed basic copper-iron-nickel catalyst on pumice stone (50 parts of purified pumice stone, 36½ parts of purest ferric nitrate, 40 parts of copper carbonate CuCO$_3$.Cu(OH)$_2$, 10 parts of basic nickel carbonate and 48 parts by volume of water glass, dried at 110° C.). Through this tube a current of ethylnaphthalene vapour is passed at a uniform rate at about 550° C. in vacuo, say, for example 10–20 mms. of mercury. The vapours leaving the reaction tube are condensed in an attached cooling apparatus at a reduced pressure and the uncondensable gases, which consist to the extent of 95% of hydrogen, are drawn off continuously by a vacuum pump and forced into a gas holder for measurement. It is found that the quantity of hydrogen liberated corresponds substantially to the quantity of vinyl naphthalene produced. For one passage of the starting material through the reaction tube there is attained an 80% conversion of the saturated hydrocarbon into the unsaturated hydrocarbon. The resulting condensed hydrocarbon mixture can be separated in the known manner from the small quantity of unchanged hydrocarbon by the polymerization of the unsaturated hydrocarbon formed. This unchanged portion can then be passed again through the reaction tube.

The vinyl naphthalene can, however, also be caused to separate in a crystalline form by cooling the liquid reaction mixture to temperatures below 0° C. and filtered from the mother liquor. After crystallization from anhydrous ethyl alcohol the β-vinylnaphthalene thus obtained melts at 56.5–58° C. According to the conditions of the crystallization it forms almost colourless leaflets or needles. The boiling point of the β-vinylnaphthalene is 119°–120° C. at a pressure of 6 mms. of mercury.

Example 2

Ethylbenzene is passed in vacuo, such as described in Example 1, through a reaction tube heated to 600° C. and filled with a catalyst, consisting of cerium oxide precipitated on broken pieces of clay. The catalyst is deposited on the carrier in a manner similar to that described in Example 1. The waste gases leaving the tube, consisting substantially of hydrogen, are drawn off continuously. After a single passage of the starting material through the reaction tube a product is obtained, consisting of about 50% of pure styrene and about 50% pure ethylbenzene. The styrene can be isolated from the mixture in the known manner.

Example 3

Ethylnaphthalene is passed in the form of vapour through a copper tube filled with cerium oxide catalyst, deposited on any desired carrier. During this process the tube is heated uniformly to 650° C. and maintained at a pressure of 10 mms. of mercury. The vapours when cooled in an appropriate attached appliance yield an almost colourless to light yellow coloured condensate, free from empyreumatic substances and containing 75–85% of pure vinylnaphthalene besides unchanged ethylnaphthalene.

Example 4

For the manufacture of styrene ethylbenzene is subjected to the treatment described in Example 3 for the dehydrogenation of ethylnaphthalene. Instead of the cerium oxide catalyst, however, a mixed catalyst is employed, consisting of cerium oxide and zinc oxide whilst the reaction temperature is maintained at 630° C. Thus a reaction product is obtained, containing 70–90% of styrene in addition to unchanged ethylbenzene.

I claim:

1. Process for the manufacture of aromatic hydrocarbons containing unsaturated side chains which comprises subjecting a substance selected from the group consisting of aromatic hydrocarbons having at least one saturated side chain of the formula: —CHR—CH$_2$R', wherein R and R' each stand for a hydrogen atom or an aliphatic hydrocarbon radical and chloro substitution products thereof, to temperatures of about 450° C. to about 700° C. at a strongly reduced pressure.

2. Process for the manufacture of aromatic hydrocarbons containing unsaturated side chains which comprises subjecting a substance selected from the group consisting of aromatic hydrocarbons having at least one saturated side chain of the formula: —CHR—CH$_2$R', wherein R and R' each stand for a hydrogen atom or an aliphatic hydrocarbon radical and chloro substitution products thereof, to temperatures of about 450° C. to about 700° C. at a pressure below 100 mms. of mercury.

3. Process for the manufacture of aromatic hydrocarbons containing unsaturated side chains which comprises subjecting a substance selected from the group consisting of aromatic hydrocarbons having at least one saturated side chain of the formula: —CHR—CH$_2$R', wherein R and R' each stand for a hydrogen atom or an aliphatic hydrocarbon radical and chloro substitution products thereof, to temperatures of about 450° C. to about 700° C. at a pressure below 100 mms. of mercury in the presence of a dehydrogenating catalyst.

4. Process for the manufacture of aromatic hydrocarbons containing unsaturated side chains which comprises subjecting a substance selected from the group consisting of aromatic hydrocarbons having at least one saturated side chain of the formula: —CHR—CH$_2$R', wherein R and R' each stand for a hydrogen atom or an aliphatic hydrocarbon radical and chloro substitution products thereof, to temperatures of about 450° C. to about 700° C. at a pressure of about 10 mms. to about 20 mms. of mercury in the presence of a dehydrogenating catalyst.

5. Process for the manufacture of styrene which comprises subjecting ethylbenzene to temperatures of about 450° C. to about 700° C. at a strongly reduced pressure.

6. Process for the manufacture of styrene which comprises subjecting ethylbenzene to temperatures of about 450° C. to about 700° C. at a pressure below 100 mms. of mercury.

7. Process for the manufacture of styrene which comprises subjecting ethylbenzene to temperatures of about 450° C. to about 700° C. at a pressure below 100 mms. of mercury in the presence of a dehydrogenating catalyst.

8. Process for the manufacture of styrene which comprises subjecting ethylbenzene to a temperature of about 600° C. at a pressure of about 10 mms. to about 20 mms. of mercury in the presence of cerium oxide precipitated on broken pieces of clay.

9. Process for the manufacture of vinylnaphthalene which comprises subjecting ethylnaphthalene to a temperature of about 450° C. to about 700° C. at a strongly reduced pressure.

10. Process for the manufacture of vinylnaphthalene which comprises subjecting ethylnaphthalene to a temperature of about 450° C. to about 700° C. at a pressure below 100 mms. of mercury.

11. Process for the manufacture of vinylnaphthalene which comprises subjecting ethylnaphthalene to a temperature of about 450° C. to about 700° C. at a pressure below 100 mms. of mercury in the presence of a dehydrogenating catalyst.

12. Process for the manufacture of vinylnaphthalene which comprises subjecting ethylnaphthalene to a temperature of about 650° C. at a pressure of 10 mms. of mercury in the presence of cerium oxide precipitated on broken pieces of clay and separating the β-vinylnaphthalene from the reaction mixture by crystallization.

13. As a new product β-vinylnaphthalene having a melting point of about 56.5° C. to 58° C. and a boiling point of 119° C. to 120° C. at a pressure of 6 mms. of mercury.

HERMANN SUIDA.